United States Patent
Lee et al.

Patent Number: 5,687,191
Date of Patent: Nov. 11, 1997

[54] POST-COMPRESSION HIDDEN DATA TRANSPORT

[75] Inventors: Chong U. Lee, San Diego; Kamran Moallemi, Del Mar; Jurg Hinderling, San Diego, all of Calif.

[73] Assignee: Solana Technology Development Corporation, Solana Beach, Calif.

[21] Appl. No.: 607,330

[22] Filed: Feb. 26, 1996

Related U.S. Application Data

[60] Provisional application No. 60/008,288 Dec. 6, 1995.

[51] Int. Cl.⁶ .......................... H04L 27/00; H04L 27/28; H04K 1/00
[52] U.S. Cl. .......................... 375/216; 375/260; 375/240; 375/206
[58] Field of Search .......................... 395/2, 2.1; 375/206, 375/208, 200, 260, 240, 242, 245, 241, 216, 295, 316, 341; 381/100, 101, 2; 370/522, 527, 529; 348/384, 381, 388, 390; 455/3.1, 6.36; 341/155

[56] References Cited

U.S. PATENT DOCUMENTS

| | | | |
|---|---|---|---|
| 3,845,391 | 10/1974 | Crosby. | |
| 4,079,419 | 3/1978 | Siegle et al.. | |
| 4,313,197 | 1/1982 | Maxemchuk. | |
| 4,425,661 | 1/1984 | Moses et al.. | |
| 4,534,054 | 8/1985 | Maisel. | |
| 5,113,437 | 5/1992 | Best et al.. | |
| 5,161,210 | 11/1992 | Druyvesteyn et al. | 395/2 |
| 5,185,800 | 2/1993 | Mahieux | 381/100 |
| 5,319,735 | 6/1994 | Preuss et al.. | |
| 5,379,345 | 1/1995 | Greenberg. | |
| 5,404,377 | 4/1995 | Moses. | |
| 5,408,686 | 4/1995 | Mankovitz | 381/2 |
| 5,450,490 | 9/1995 | Jensen et al.. | |
| 5,481,643 | 1/1996 | Ten Kate et al. | 395/2.36 |
| 5,490,170 | 2/1996 | Akagirir et al. | 375/240 |
| 5,561,849 | 10/1996 | Mankovitz | 455/45 |
| 5,588,022 | 12/1996 | Dapper et al. | 375/260 |
| 5,598,228 | 1/1997 | Saitoh | 348/732 |

OTHER PUBLICATIONS

I. J. Cox, et al., "Secure Spread Spectrum Watermarking for Multimedia," NEC Research Institute, Technical Report 95-10, Dec., 1995, pp. 1–33.

*Primary Examiner*—Tesfaldet Bocure
*Attorney, Agent, or Firm*—Barry R. Lipsitz; Ralph F. Hoppin

[57] ABSTRACT

Auxiliary data subband samples representing an auxiliary data signal are transported in a subband-coded compressed digital audio signal without decompressing the data. A pre-existing packetized data stream is provided to an input of a encoder. Subband audio samples are extracted from the packet stream and normalized if required. The data to be transported modulates data carrier subbands including, for example, a pseudo-noise (PN) spread spectrum signal, each subband of which has a bandwidth corresponding to those of the digital audio signal. The data carrier sequence can also include a sparse PN sequence, sample twiddle sequence, or a bit twiddle sequence. The modulated data carrier sequence is combined with the audio subband samples to form a combined signal in which the auxiliary data subband samples are carried. The combined signal is then multiplexed into the pre-existing packet stream. In a decoder, the combined signal is demodulated to recover the auxiliary data signal. The recovered auxiliary data signal is carried substantially inaudibly in the audio signal and is spectrally shaped according to the audio signal to enhance concealment.

43 Claims, 7 Drawing Sheets

POST-COMPRESSION HIDDEN DATA TRANSPORT

BACKGROUND OF THE INVENTION

This application claims the benefit of U.S. Provisional Application No. 60/008,288, filed Dec. 6, 1995. The present invention relates to a method and apparatus for hiding data in an audio signal, and more particularly to a scheme for providing an inaudible auxiliary data signal in a subband-coded compressed digital audio data stream being communicated over existing communication channels. The scheme is characterized as post-compression hidden data transport (PC-HDT). A corresponding method and apparatus for recovering the hidden data from the audio signal are also disclosed, in addition to a digital data storage medium.

Providing hidden data in a digital audio signal is advantageous in a number of situations. For example, it may be desirable to enable data ancillary to the audio data to be carried. This ancillary data could, for example, provide a copy management scheme which precludes the audio signal from being copied without proper authorization, or otherwise control the use of the audio program or other information (e.g., video or multimedia) associated with the audio signal. Information identifying the content of the audio signal, such as the name and/or performers of an audio program, and polling information for market research or commercial verification might also be hidden using such a scheme. The scheme should be compatible with various storage media, including optical storage media such as the Digital Video Disc (DVD), Compact Disc (CD) including CD-ROM, Digital Audio Tape (DAT), and magnetic storage media such as Video Cassette Recorder (VCR) tape and audio cassette tape.

Further, the type of information carried by the audio signal should be virtually unlimited. For example, it would be advantageous to allow data that is completely unrelated to the audio signal to be carried (e.g., transmitting stock price data or "electronic coupons" with a musical performance). Moreover, the scheme used to hide data in the audio signal should be able to hide either a modulated carrier, an unmodulated carrier (e.g., pilot), or a combination of both.

Generally, the capacity of a transmission channel to carry additional information is limited by the bandwidth of the channel. Since the bandwidth of communication channels is limited by the realities of the electromagnetic spectrum, and, for wireless channels, may be regulated by law, it has become necessary to develop techniques for increasing the amount of information that can be carried within a channel of a given bandwidth. For example, techniques for compressing digital data to squeeze more data within a given bandwidth or data storage space are well known.

Compression refers to reducing the number of data bits that are needed to encode a source signal so that the source signal may be recovered by a decoder with acceptable fidelity. For example, in audio applications, it is known that the human ear is relatively less sensitive to amplitude variations in high-frequency components of an audio signal. Accordingly, audio data can be encoded using frequency transformation techniques which allocate fewer bits to high-frequency components. In this manner, the total number of data bits which must be transmitted is reduced, and the listener still receives a satisfactory sound.

Moreover, due to the method of representing sound in audio systems, there is an inherent redundancy in a conventional audio signal. Instantaneous sound pressure is recorded by an amplitude value or voltage as an audio signal, presenting a mismatch between the actual representation and human auditory perception. That is, even though the human ear is somewhat nonlinear in many respects, it behaves like a bank of bandpass filters or a spectrum analyzer. At each frequency, the perception is approximately logarithmic such that the amount of noise that can be tolerated is proportional to the signal.

In other words, once the signal-to-noise ratio (SNR) exceeds a certain threshold, the noise is no longer audible. This SNR threshold is typically less than 30 dB and is maintained over most of the audible frequency range. See, e.g., "Signal Compression Based on Models of Human Perception," by M. Jayant, J. Johnston, and R. Safranek, *Proceedings of the IEEE*, October 1993, Vol. 81, No. 10. Such a relatively low SNR requirement can allow an information-bearing signal to pass the existing audio signal chain (e.g., from the audio signal source to the transducers reproducing the sound) undetected by a human ear, as long as the SNR is maintained at all frequencies.

Accordingly, psychoacoustic models developed for human auditory perception allow compression of digital audio data. See, generally, *Digital Signal Processing of Speech Signals*, by L. R. Rabiner and R. W. Schafer (Prentice-Hall, Englewood Cliffs, N.J., 1978). It is known that audio data typically includes voice or music with frequency components in the range of roughly 0 to 20 KHz, with most speech signals falling in the range from 200 to 3,200 Hz.

Consequently, another approach to communicating additional data within a given bandwidth is to identify areas where supplemental information can be inaudibly transported concurrently with a primary audio signal. In one such technique, the bandwidth of the audio channel remains as is, and additional information is packed with the audio information such that it can be retrieved without significantly degrading the quality of the primary audio signal. One method for embedding digital information in an audio waveform is disclosed in commonly assigned U.S. patent application Ser. No. 08/524,132 to C. U. Lee et al., entitled "Method and Apparatus for Transporting Auxiliary Data in Audio Signals," filed Sep. 6, 1995 and incorporated herein by reference.

Thus, it would be desirable to have a system which is compatible with existing audio data communication schemes, where an analog signal is digitized, compressed, packed in a predefined frame format, and then transmitted in a bitstream. The system should thus allow hidden data to be embedded in the compressed digital audio signal without requiring full decompression of the signal. Additionally, the system should provide spectral shaping of the hidden data to further enhance its concealment therein. Such a system should also reduce computational complexity and expense, and should be compatible with modern subband based compression schemes.

In particular, subband coding is a form of spectral waveform coding that is common among modern audio data compression schemes. Generally speaking, an analog waveform representing audio data can be coded to the digital domain using a variety of techniques, including temporal waveform coding, model-based source coding, and spectral waveform coding.

With temporal waveform coding, such as pulse code modulation (PCM), differential pulse code modulation (DPCM), and adaptive PCM and DPCM, the analog waveform is quantized to one of $2^R$ different amplitude levels, where R is the number of binary digits used to represent each sample. Each sample of the waveform is then encoded independently of all other samples.

With DPCM, the difference between successive data samples is encoded rather than the amplitude of the sample. This encoding scheme takes advantage of the fact that the average change in amplitude between successive data samples is usually relatively small. Thus, fewer bits are typically required to represent the amplitude differences. With adaptive PCM and DPCM, a uniform quantizer is used that varies its step size (i.e., the distance between quantized amplitude values) based on the variance of past signal samples.

With model-based source coding, the audio source is modelled as a linear system (i.e., filter) that results in the desired audio signal when excited by an appropriate input signal, such as a periodic impulse generator or a white noise generator. The most common model-based coding method is linear predictive coding (LPC), where the filter is defined by filter coefficients and a gain parameter. Thus, in order to reconstruct the audio waveform, the filter coefficients, gain parameter, and excitation function must be transmitted to the receiver.

Spectral waveform coding encompasses adaptive transform coding and subband coding. As used herein, the term "subband coding" is meant to include both filter bank based coding and transform coding. The two methodologies are similar since, in either case, data corresponding to predefined frequency bands of a waveform is coded.

With adaptive transform coding, the audio waveform is sampled and divided into frames with a predetermined number of data samples. The data in each frame is transformed into the spectral domain using, for example, the Discrete Fourier Transformation, Discrete Cosine Transformation, Karhunen-Loeve Transformation, or a wavelet transformation, and then coded.

With filter bank based coding, the analog audio signal is filtered into a number of frequency bands or subbands, and the signal in each subband is separately encoded. For example, in speech encoding, the subbands are often sized narrower at lower frequencies since quantization noise is more noticeable at lower frequencies, and more encoding bits are allocated to the lower frequency subbands than the higher frequency subbands. With this scheme, a first filter divides the audio spectrum into a lower spectrum (e.g., 0–1,600 Hz) and an upper spectrum (1,600–3,200 Hz). Then, a second filter splits the low band into another low band (0–800 Hz) and high band (800–1,600 Hz), and so forth. Thus, the lower frequency band is repeatedly divided by a factor of two. Quadrature-mirror filters are typically used for subdividing the audio spectrum because of their alias-free response. In other schemes where the full range of human perception is required (i.e., with a musical passage), the subbands are sized with equal bandwidths. Other modifications can be provided for specific applications.

Furthermore, spectral envelope (i.e., power spectrum) information can be obtained from the audio signal by measuring the amount of signal energy in each subband, where the signal power is proportional to the square of the signal energy. This information can be used to normalize the subband samples prior to encoding, for example, by scaling the samples by a maximum amplitude value such that all normalized samples have a value between zero and one. The scale factors can be transmitted along with the encoded data samples to allow reconstruction of the signal at a receiver.

Additionally, the spectral envelope information can be used advantageously in allocating bits to encode the audio data in each subband. For example, since the amount of perceptually tolerable noise in a subband is proportional to the signal energy in that subband, quantization noise in subbands with relatively higher signal energy will be more tolerable, and data samples from that subband can be allocated fewer bits. Moreover, a subband with a signal energy which is significantly higher than a neighboring subband will tend to "drown out" the neighboring subband. Thus, additional quantization noise in the neighboring subband will not be perceptible, and fewer bits can be allocated for coding the weaker subband. In many modern audio encoders, three or four bits are typically allocated per subband data sample. Bit allocation data can be transmitted along with the encoded data samples to allow inverse quantization of the signal at a receiver.

In fact, many modern audio compression algorithms rely on some form of subband coding technique, including the Moving Picture Experts Group (MPEG) audio algorithm (i.e., MUSICAM), Dolby Laboratories AC-2 and AC-3 Multi-Channel Digital Audio Compression Systems, and AMPAC. Details of the MPEG audio algorithm can be found in MPEG Standards Document CD 11172-3, entitled "Coding of Moving Pictures and Associated Audio for Digital Storage Media at up to about 1.5 MBIT/s (Part 3-Audio)", incorporated herein by reference.

Using the MPEG audio algorithm, digital audio data can be transmitted with video data in a packetized data stream. The audio portion of the signal can provide a high-fidelity stereo signal that accompanies a television program, or may contain an alternate language accompaniment for foreign-language viewers. Moreover, audio-only services can be provided which allow the consumer to listen to a variety of high-fidelity music programming. Furthermore, the MPEG standard is compatible with both wired communication paths, including traditional cable television systems, and wireless paths, such as in Direct Broad-cast Satellite (DBS) systems.

As mentioned, inaudible auxiliary data in a digital audio stream data can be used advantageously for various purposes, including program identification, copy management, verification, polling, and other commercial marketing uses.

Accordingly, it would be advantageous to provide a method for hiding auxiliary data in a digital audio data stream which is communicated over existing communication paths as a pre-existing bitstream. Such a method should enable the auxiliary data to be carried with the audio signal without substantially altering the quality of the audio signal or interfering with other data in the bitstream.

In particular, the scheme should allow the provision of auxiliary data in respective subbands of a digital compressed audio data stream. The scheme should be compatible with a hidden data transport process that encodes auxiliary digital data into the digital audio signal without requiring decompression. Similarly, the scheme should allow recovery of the auxiliary data from the compressed digital audio signal. Finally, the scheme should provide spectral shaping of the auxiliary signal to enhance its concealment therein.

The present invention relates to a method and apparatus for transporting and recovering information hidden in a digital audio signal having the aforementioned and other advantages.

SUMMARY OF THE PRESENT INVENTION

In accordance with the present invention, a method and apparatus are provided for hiding auxiliary information in a subband-coded compressed digital audio signal which is transmitted over a communication channel in a pre-existing bitstream. Unlike conventional methods, the present invention does not require decompression of the audio data in order to embed the auxiliary data. Furthermore, by embedding the same auxiliary data into different subband channels of the audio data, advantageous signal-to-noise ratio (SNR) characteristics result. Moreover, the present invention also provides spectral shaping of the auxiliary data signal to enhance its concealment therein.

A method for providing auxiliary data subband samples in a subband coded digital audio data stream comprises the steps of: providing a plurality of audio subband samples; providing a data carrier sequence; subband filtering the data carrier sequence to achieve data carrier subband samples; modulating the data carrier subband samples with the auxiliary data to achieve auxiliary data subband samples; combining the auxiliary data subband samples with the corresponding audio subband samples to produce combined subband samples in which the auxiliary data subband samples are carried substantially inaudibly; and providing the combined subband samples for transport in the digital audio data stream.

In alternate embodiments, multiple layers of auxiliary data subband samples are encoded in the digital audio data stream. Each layer can have a unique corresponding pseudo-noise (PN) sequence, or the same PN sequence may be used by shifting the relative position of the layers. Furthermore, subband samples from different auxiliary signals can be embedded in different subbands, the same subbands, or combinations thereof in the digital audio data stream. The data carrier sequence may comprise a spread spectrum PN sequence, a "sparse" PN sequence, a "sample twiddle" sequence, or a "bit twiddle" sequence as described in greater detail below.

When the audio subband samples have a nonuniform power spectrum, the method comprises the further steps of: normalizing the audio subband samples to provide an approximately uniform power spectrum thereof; and de-normalizing the combined subband samples subsequent to the normalizing step to restore the nonuniform power spectrum of the audio subband samples, and to spectrally shape the auxiliary data subband samples in the combined subband samples according to the nonuniform power spectrum.

Similarly, a method for recovering auxiliary data subband samples representative of an auxiliary data signal, wherein the auxiliary data subband samples are carried with audio subband samples in combined subband samples in a digital data stream, comprises the steps of: providing combined subband samples from the data stream; and demodulating the combined subband samples using a data carrier sequence to recover the auxiliary data subband samples.

When the auxiliary data subband samples are carried in the combined subband samples using a PN spread spectrum sequence, the method comprises the further steps of: despreading the recovered auxiliary data subband samples using a PN spread spectrum sequence or other data carrier sequence; and summing the despread auxiliary data subband samples across selected subband channels to recovery the auxiliary data signal.

Corresponding encoding and decoding apparatus are also disclosed.

Furthermore, a digital data storage media is disclosed which carries combined subband samples including audio subband samples which represent an audio signal, and auxiliary data subband samples which represent an auxiliary data signal; wherein: the auxiliary data subband samples are provided over at least one subband corresponding to the audio subband samples; and the auxiliary data signal can be recovered from the auxiliary data subband samples such that the auxiliary data signal is carried substantially inaudibly in the audio signal, and the auxiliary data signal is spectrally shaped according to the audio signal.

DETAILED DESCRIPTION OF THE INVENTION

The present invention relates to a method and apparatus for providing an inaudible auxiliary data signal in a subband-coded compressed digital audio data stream being communicated over existing channels. As used herein, the term "subband coding" is meant to include both filter bank based coding and transform coding such as the Discrete Fourier Transformation, Discrete Cosine Transformation, Karhunen-Loeve Transformation, or a wavelet transformation. The scheme is characterized as post-compression hidden data transport (PC-HDT).

The present invention is compatible with existing modern audio compression algorithms which rely on some form of subband coding technique including, for example, the Moving Picture Experts Group (MPEG) Audio algorithm (i.e., MUSICAM), Dolby Laboratories AC-2 and AC-3 Multi-Channel Digital Audio Compression Systems, and AMPAC.

Under the MPEG audio algorithm, digital audio data can be advantageously transmitted with video data in a packetized transport stream. For instance, the transport stream can be transmitted via satellite or terrestrial methods to an individual's home or to the headend of a cable television distribution system. Alternatively, the transport stream can be provided locally from an encoded source media, such as a digital video disc (DVD), compact disc (CD) or digital audio tape (DAT).

Figure 1:
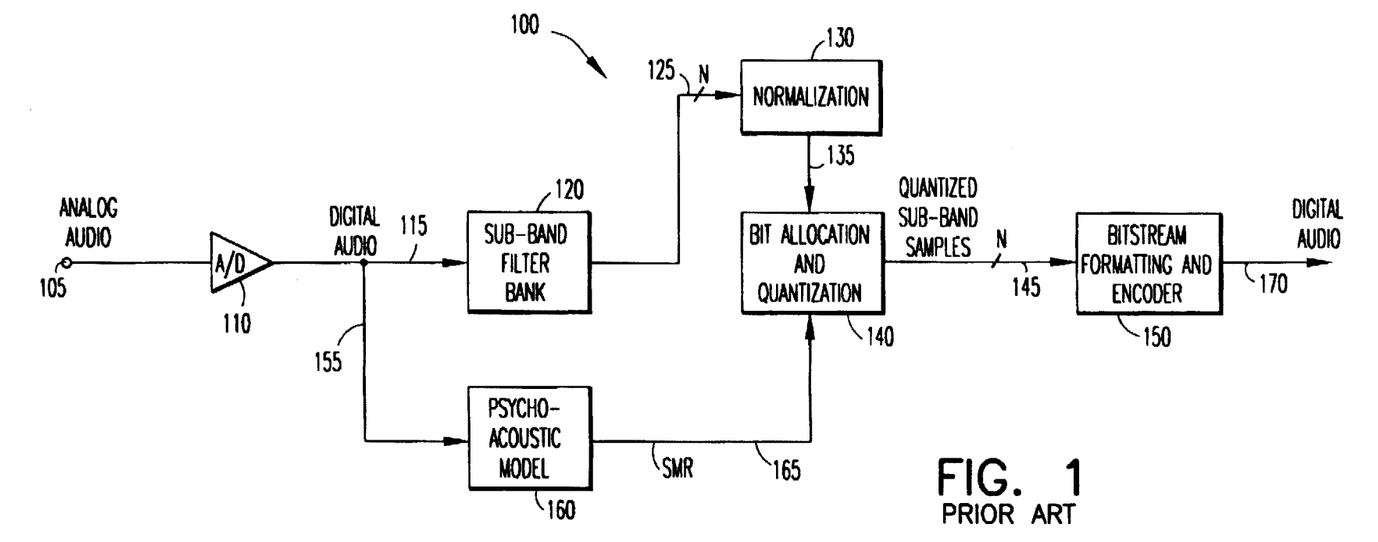
FIG. 1 is a block diagram of a conventional psychoacoustic subband encoder.

With the MPEG audio algorithm, a digital audio signal is encoded according to a psychoacoustic model. FIG. 1 is a block diagram of a conventional psychoacoustic subband encoder, shown generally at 100, that can be used to provide a subband coded digital audio signal to the post-compression hidden data transport system in accordance with the present invention. First, an analog waveform is received by the encoder via terminal 105, and converted to digital form with an analog-to-digital (A/D) converter 110. For example, the sampling frequency may be 44.1 KHz, while each data sample is quantized using sixteen bits, thereby allowing $2^{16}$=65,536 amplitude levels. The resulting digital audio signal is communicated via line 115 to a subband filter bank 120, and via line 155 to a psychoacoustic model 160. The subband filter bank 120 performs a time domain to frequency domain mapping of the audio signal. For example, N equally spaced subbands (e.g., N=32) can be used with groups of twelve data samples per subband. Each output of the subband filter faithfully represents the part of the audio signal that falls within that spectral subband.

The psychoacoustic model 160 calculates a signal-to-mask ratio (SMR) which is used in subsequent bit allocation and quantization. The SMR is indicative of the noise level in each subband that would be barely perceptible to the average person, and is proportional to the audio signal energy in the subband. The psychoacoustic model 160 may also account for the masking phenomena between subbands, where a subband with significantly higher energy will tend to "drown out" a neighboring subband. Accordingly, the SMR of the neighboring subband will increase such that it need not be finely quantized.

The thirty-two subband signals are provided to a normalization function 130 via line 125. The normalization function 130 analyzes the signal amplitude of the subband samples in each subband to determine a scale factor for each subband. The scale factor, which is based on the maximum of the absolute values of the twelve subband data samples, is then used to normalize the subband samples. The scale factors are ultimately provided with the encoded digital audio signal so that full reconstruction of the audio signal can occur at a receiver.

However, the scale factors, which represent the dynamic range of the spectral envelope for each subband, are encoded separately from the subband samples. Because of the limits of human auditory perception, this allows the subband samples to be quantized relatively coarsely with fewer bits than the baseband audio waveform samples. The spectral envelope information (scaling factors) can also be coded relatively coarsely and do not have to be updated as often as the subband samples. This results in a significant bit rate reduction (i.e., compression).

The normalized subband samples are provided along with the scale factors to a bit allocation and quantization function 140 via line 135. The SMR from the psychoacoustic model 160 is provided to the bit allocation and quantization function 140 via line 165. The bit allocation and quantization function 140 determines the number of bits which will be used to represent the quantized subband samples. Bit allocation must be sufficient so that quantization noise does not exceed the SMR, but not so great that a maximum encoding bit rate threshold is exceeded. Typically, three or four bits are allocated per subband data sample. For example, when four bits are allocated to a data sample, the sample is quantized to one of $2^4$=16 quantization levels. Compared to the original 16 quantization bits allocated by the A/D converter 110, this represents a compression factor of 16:4, or 4:1. A four-bit code corresponding to the bit allocation in each subband is determined, and ultimately transmitted along with the encoded subband data samples to allow inverse quantization of the signal at a receiver.

The thirty-two quantized data samples are provided to a bitstream formatting and encoder function 150 via line 145. Here, the subband samples, scale factors, and bit allocation codes are encoded in packets or frames of data. Each subband sample can be encoded using conventional modulation techniques such as pulse-code modulation (PCM). Additional compression techniques including Huffman coding may also be employed to represent the quantized samples, but this results in additional complexity. The encoded digital data stream is output from the psychoacoustic encoder 100 via line 170.

Figure 2:
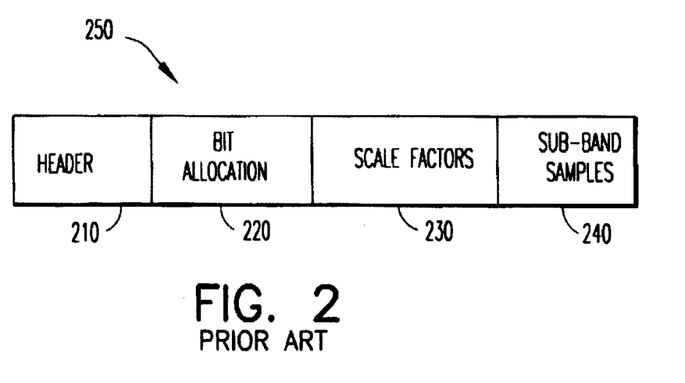
FIG. 2 is a diagrammatic illustration of the conventional frame formatting of a subband coded digital audio signal that may be provided as the input to the post-compression hidden data transport system in accordance with the present invention.

FIG. 2 is a diagrammatic illustration of the conventional frame formatting of a subband-coded compressed digital audio signal that can be processed using the present invention. It should be understood that the format shown in FIG. 2 is only one possible example of various formats that could be provided. In the example discussed, each of the thirty-two subbands contains twelve audio data samples. Accordingly, each frame will contain 12×32, or 384 audio data samples, and the frame size will be 384/44.1 KHz=8.7074 milliseconds (ms). The frame 250 includes a header portion 210, which identifies the beginning of the frame and may have other information such as a sequence number, synchronization data, and sample rate data. The MPEG frame 250 also includes a bit allocation code portion 220 which indicates the starting position of the data and how many bits are used. The frame 250 further includes a scale factor portion 230 which indicates the dynamic range of the subband samples; and, a subband data sample portion 240. The subband data samples may be encoded in a PCM format. In alternative schemes, audio data from more than one channel may be carried in a single frame.

Figure 3A:
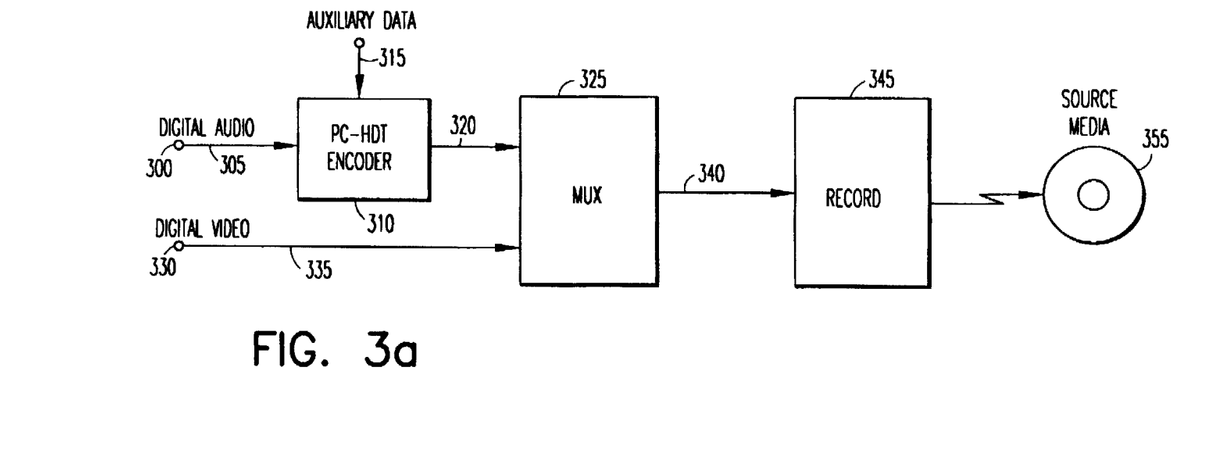
FIG. 3a is a block diagram of a first representative application of the post-compression hidden data transport encoder in accordance with the present invention.

FIG. 3a is a block diagram of a representative application of the post-compression hidden data transport (PC-HDT) encoder in accordance with the present invention. A demultiplexer (not shown) separates digital audio and video signals from a multiplexed bitstream. The compressed digitized audio data stream is then provided to the PC-HDT encoder 310 via input terminal 300 and line 305. The PC-HDT encoder 310 also receives auxiliary data which is to be embedded in the audio signal via line 315. A combined signal representing auxiliary data subband samples and audio data subband samples is provided via line 320 to a multiplexer 325. A digital video signal is shown being provided via input terminal 330 and line 335 to the multiplexer 325, where the audio and video signals are multiplexed into a single multi-channel data stream at line 340. It should be understood that the PC-HDT encoder 310 will delay the digital audio signal relative to the digital video signal. This can be accounted for by using conventional techniques, such as synchronization means included with the multiplexer 325.

Furthermore, although only one audio and one video signal are shown, it should be appreciated that several channels may be provided concurrently. For example, the multiplexed signal at line 340 may include several programs including both video and accompanying audio and/or data (e.g., for alternate language viewers and teletext for the hearing impaired), audio-only programming, and various data-only programming (e.g., stock price data, weather data).

The multiplexed digital data stream is provided via line 340 to a recording device 345, where the data is written to source media 355 such as a CD, DVD, or DAT. The source medium 355 may be a master copy that is used, in turn, to record to other media for widespread distribution.

Figure 3B:
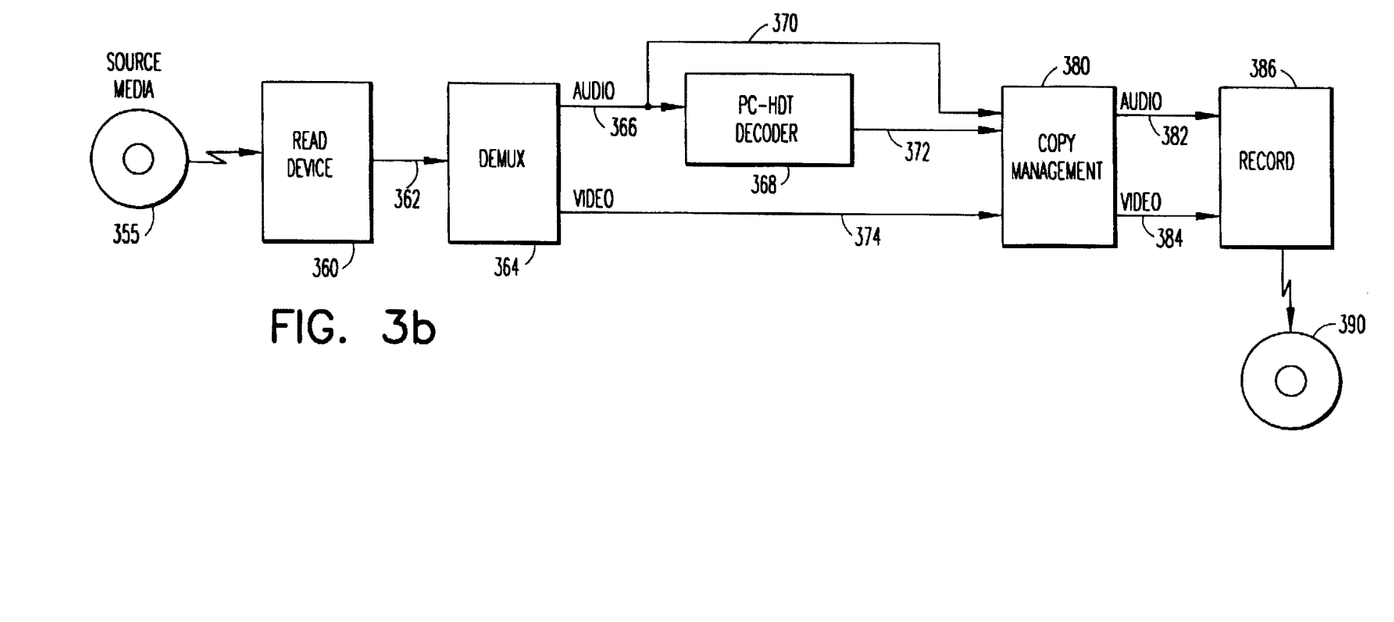
FIG. 3b is a block diagram of a second representative application of the post-compression hidden data transport decoder in accordance with the present invention.

FIG. 3b is a block diagram of a representative application of the post-compression hidden data transport (PC-HDT) decoder in accordance with the present invention. The source media 355 including the digitized audio signal with hidden auxiliary data is provided to a read device 360, which may include, for example, a DVD player. The read device 360 reads the storage medium 355 and outputs a digital data stream to a demultiplexer 364 via line 362. The demultiplexer 364 separates the audio data stream with hidden auxiliary data from the video or other digital data, and may include synchronization means to account for the delay in the audio signal caused by the PC-HDT decoder 368. The audio data is provided via line 366 to the PC-HDT decoder 368 of the present invention, and to a copy management function 380 via bypass line 370.

At the PC-HDT decoder 368, the auxiliary data is retrieved from the audio data stream, and provided to the copy management function 380 via line 372. The video or other data is provided to the copy management or control function 380 via line 374. The copy management function 380 uses the auxiliary data to determine whether a copy may be made of the digital signals from the source media 355. If so, the audio signal with hidden auxiliary data is provided to a recording device 386 via line 382, and the accompanying video or other data signal is provided to the recording device 386 via line 384. A new source medium 390 encoded with the digital data from the master source medium 355 is provided via line 388 from the recording device 386.

Note that the new source media 390 is also encoded with the hidden auxiliary data. Therefore, the new source media 390 will also be subject to the copy management function 380 of the decoder. In this, way, the distributor can control whether the original source media can be duplicated. For instance, a distributor may provide auxiliary data that can be used to prevent copying of the source media in order to protect proprietary information. Alternatively, the distributor may provide auxiliary data that allows copying of source media such as promotional or demonstration material that is designed to encourage a consumer to purchase additional protected source media.

An additional representative application of the present invention is with a broad-cast signal such as a television signal provided via a satellite or cable communication path. For example, a digital audio soundtrack may be provided which accompanies a television program such as a movie or other special event. The multiplexed digital signal, or transport data stream, which can comprise several hundred channels of digital information, is received by an individual in his home via a Direct Broad-cast Satellite (DBS) system or via a cable communication path or the like.

The present invention can be employed to provide copy protection of these digital programming services by precluding the individual from recording the digital data on a device such as a DVD or DAT which is equipped with the PC-HDT decoder. Specifically, the PC-HDT encoder of the present invention can be used to encode hidden auxiliary data in the audio portion of the transport data stream. Moreover, the hidden auxiliary data may be embedded prior to broad-cast or at some intermediate point, and does not interfere with other data carried in the data stream. For example, a cable headend operator may receive digital programming via satellite, and embed the received signal with the hidden auxiliary data prior to distribution via the cable network.

When the combined digital audio and auxiliary data signal is received by an individual along with accompanying video or other data, the data is decoded and unscrambled by a set-top box which communicates with a user's television and high-fidelity stereo system. Such set-top devices are typically provided by the cable television operator or DBS service provider as part of a service agreement. The set-top box decompresses and decodes the audio signal and associated video signal, if any, and reproduces them for the user's listening and viewing enjoyment. Since the auxiliary data signal is inaudible relative to the normal audio, the auxiliary data signal will not be detected by the listener.

However, the auxiliary data signal remains embedded in the audio signal. The auxiliary data signal can be used with appropriate circuitry, for example, to prevent the user from copying the signal on a recording device that is equipped with the PC-HDT decoder of the present invention. Alternatively, even if an individual records the signal on a conventional recording device such as a magnetic tape recorder, the auxiliary data signal remains embedded, and thus acts as an identification mark that can be used to verify the authenticity of any subsequent copy. This is helpful in thwarting "pirates" who duplicate and distribute programming without authorization.

Furthermore, in a point-to-point distribution system, wherein audio data is transmitted separately to individuals, the auxiliary data signal can represent a unique identification number, such as an order number or customer number. This information may allow the identification of an individual pirate from a subsequent illicit copy of the audio signal.

Figure 4:
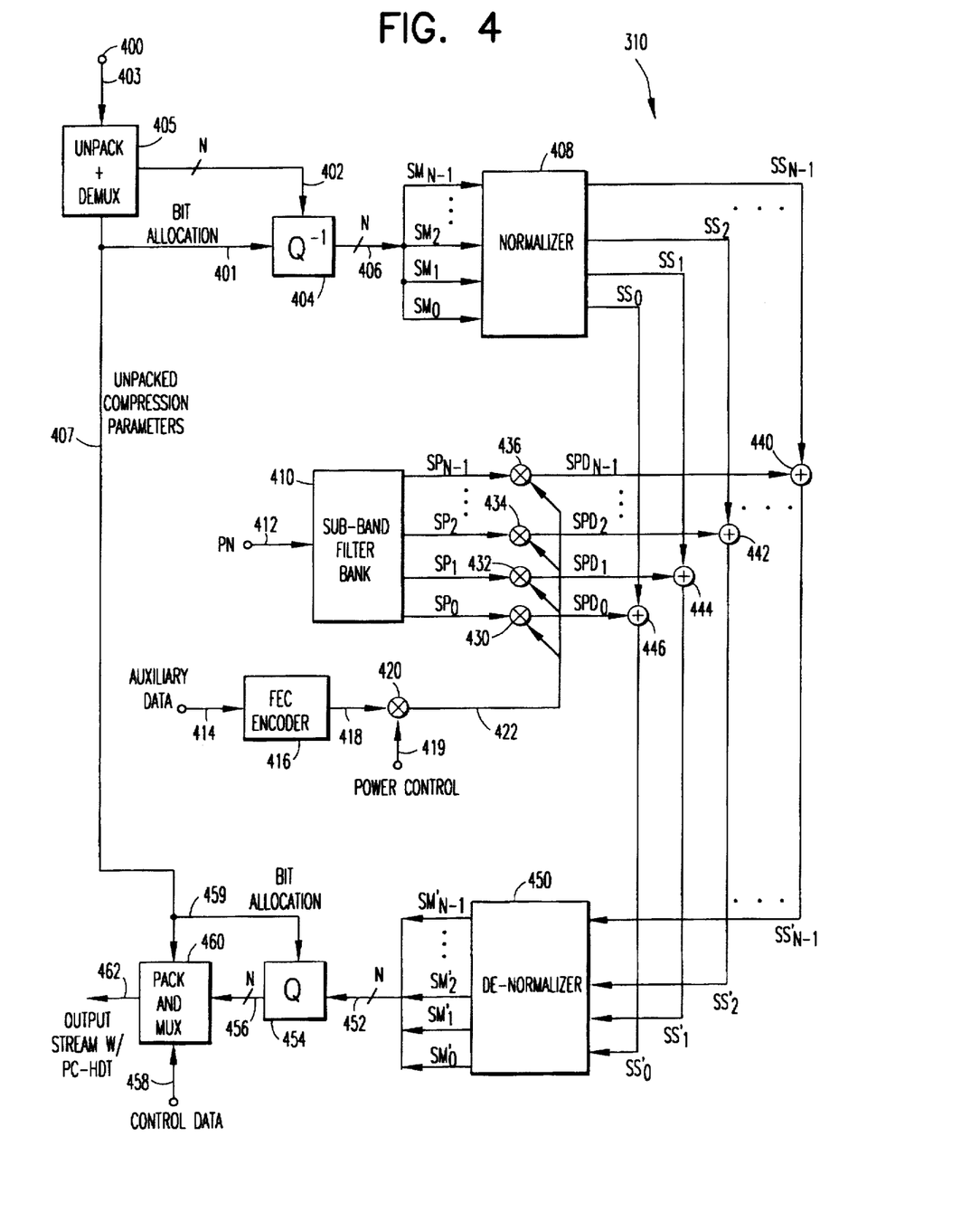
FIG. 4 is a block diagram of a post-compression hidden data transport system encoder in accordance with the present invention.

FIG. 4 is a block diagram of a post-compression hidden data transport (PC-HDT) system encoder 310 in accordance with the present invention. The PC-HDT embeds inaudible auxiliary data in a subband-encoded compressed digital audio signal without the need to fully decompress the signal. A pre-existing digital bitstream including compressed digital audio data is received by the encoder at terminal 400, and provided to a demultiplexer and unpack (e.g., unpacketize) function 405 via line 403.

The demultiplexer and unpack function 405 demultiplexes frames or packets of digital audio data from the remainder of the signal. The various portions of the audio frame are also unpacked. For instance, referring to FIG. 2 and FIG. 4, the bit allocation data 220 is unpacked from the frame 250 and provided to an inverse quantizer 404 via line 401. The audio subband samples 240 are unpacked and provided to the inverse quantizer 404 via line 402.

Commonly, when the audio subband samples are normalized before entering the bitstream, the subband samples are encoded as a decimal number with a mantissa and exponent portion, wherein the mantissa represents the audio subband data samples, and the exponent represents the scaling factors (e.g., spectral envelope information) for each subband. In this case, only the mantissa of the subband samples need be provided to the inverse quantizer 404 via line 402.

The inverse quantizer 404 performs different functions depending on the format of the packetized data stream. For example, the subband samples typically comprise binary data which may be in a sign and magnitude representation, or in a two's complement representation. The subband samples are converted to a two's complement representation if not already provided as such.

Furthermore, in the example discussed, data samples from thirty-two subbands are provided. Accordingly, lines 402 and 406, designated with the letter "N", each represent N=32 separate communication lines.

The thirty-two subbands of audio data samples after inverse quantization are communicated to lines 406 which are also illustrated as individual lines $SM_0$, $SM_1$, $SM_2$, ..., $SM_{N-1}$. The designation "SM" indicates that the mantissa of the subband samples is being provided. A normalizer 408 is optionally provided in the event that the subband samples are not already normalized. The normalizer 408 computes the average energy over a small number of samples and divides each individual sample by the square root of the average energy, to provide a uniform power spectrum across all subbands.

Normalized audio subband samples are provided on the N lines designated by $SS_0$, $SS_1$, $SS_2$, ..., $SS_{N-1}$. The normalized audio subband samples are then combined with auxiliary data subband samples $SPD_0$, $SPD_1$, $SPD_2$, ..., $SPD_{N-1}$ at combiners 446, 444, 442, and 440, respectively. The combiners may comprise, for example, XOR gates. Specifically, $SS_0$ is combined with $SPD_0$ at combiner 446, $SS_1$ is combined with $SPD_1$ at combiner 444, $SS_2$ is combined with $SPD_2$ at combiner 442, and $SS_{N-1}$ is combined with $SPD_{N-1}$ at combiner 440. The remaining audio subband samples and auxiliary data subband samples (not separately shown) are combined in a similar manner.

The auxiliary data subband samples $SPD_0$, $SPD_1$, $SPD_2$, ..., $SPD_{N-1}$ can be spread spectrum signals which are generated from a subband filtered pseudo-noise (PN) sequence and from an auxiliary data waveform. In particular, a PN sequence is provided to a subband filter bank 410 via line 412. The subband filter bank corresponds to the subband filter bank used to filter the digital audio (e.g., bank 120 shown in FIG. 1). The auxiliary data signal is provided via line 414 to a conventional forward error correction (FEC) encoder 416, which, while not required, provides redundant data bits in the auxiliary data stream for downstream error recovery.

Note that the data rate of the auxiliary data subband samples is significantly slower than that of the audio subband samples. For example, with a processing gain $G_p$ or spread rate of 2.048, a PN sequence clock rate (chip frequency) of 44.1 KHz, and assuming a rate R=1/2 FEC encoder, the auxiliary data bit rate that can be accommodated is 44,100/2,048/2≈10 bits per second (bps).

The FEC-encoded auxiliary data signal is provided via lines 418 and 422 to a plurality of modulators 430, 432,434 and 436, which modulate the data carrier subband samples $SP_0$, $SP_1$, $SP_2$, ..., $SP_{N-1}$ to provide the auxiliary data subband samples $SPD_0$, $SPD_1$, $SPD_2$, ..., $SPD_{N-1}$, respectively. The sequences $SPD_0$, $SPD_1$, $SPD_2$, ..., $SPD_{N-1}$ carry the auxiliary data subband samples.

A power control signal is optionally provided via line 419 to modulator 420 to adjust the power of the auxiliary data signal carried on line 418. The power control signal ensures that the auxiliary data signal is below the noise quantization floor of the audio subband samples, and can account for possible nonlinearities in the subsequent quantizer 454 near zero so that the auxiliary signal is adequately quantized. For example, the power control may maintain a signal-to-quantization noise energy ratio (SNR) of 33, or a power ratio of 1,000 (e.g., 30 dB).

The modulated auxiliary data spread spectrum signals $SPD_0$, $SPD_1$, $SPD_2$, ..., $SPD_{N-1}$ and the audio subband samples $SS_0$, $SS_1$, $SS_2$, ..., $SS_{N-1}$ combine to produce combined samples $SS'_0$, $SS'_1$, $SS'_2$, ..., $SS'_{N-1}$, respectively, in which the auxiliary data subband samples are carried substantially inaudibly. Generally, an increasing amount of distortion will be present when the data rate of the auxiliary signal is increased.

The combined samples are provided to an optional de-normalizer 450, which performs operations that are inverse to those of the normalizer 408 in order to restore the power spectrum of the audio subband samples in the combined samples. Moreover, the de-normalizer 450 may retrieve normalization data (scaling factors) obtained from the normalizer 408 and stored temporarily in a memory (not shown).

Note that, in accordance with the present invention, the de-normalizer 450 spectrally shapes the auxiliary data subband samples in the combined samples $SS'_0$, $SS'_1$, $SS'_2$, ..., $SS'_{N-1}$ according to the power spectrum of the audio data. This spectral shaping advantageously enhances the concealment of the auxiliary data.

In the event that the audio subband samples are already normalized when received at terminal 400, the auxiliary data will be spectrally shaped according to the power spectrum of the audio data when the combined signal is decompressed and demodulated to baseband. In either case, then, de-normalized combined subband samples $SM'_0$, $SM'_1$, $SM'_2$, ..., $SM'_{N-1}$ are provided via lines 452 to quantizer 454. Quantizer 454 quantizes the combined samples using bit allocation data provided via lines 407 and 459 to provide quantized data at line 456. The quantized data, the unpacked compression parameters provided on line 407, and the control data on line 458 are packed into a new frame. Alternately, it should be understood that the same frame can be provided with the quantized data instead of creating a new frame. The control data includes, for example, synchronization data and cyclic redundancy check (CRC) bits. The new frame is provided via line 462 for transmission to a decoder. The PC-HDT encoder disclosed therefore is fully compatible with existing packet formats and protocols.

Alternatively, subband samples representing different auxiliary data signals can be carried in different subbands. The data samples in the different subbands can be generated using the same PN sequence, a time-shifted version of the same PN sequence, different PN sequences, or any combination thereof. Moreover, samples from more than one auxiliary data signal can be carried in any of the subbands. This technique, known as "layering," can be accomplished by carrying auxiliary data subband samples which were generated using a time-shifted version of the same PN sequence, different PN sequences or any combination thereof.

Furthermore, it is not required that all subbands carry auxiliary data subband samples. For example, it may be desirable to combine selected ones of the subband filtered PN sequences $SP_0$, $SP_1$, $SP_2$, ..., $SP_{N-1}$ directly with corresponding ones of the audio subband samples $SS_0$, $SS_1$, $SS_2$, ..., $SS_{N-1}$ to produce the combined samples $SS'_0$, $SS'_1$, $SS'_2$, ..., $SS'_{N-1}$. In this manner, the selected subband filtered PN sequence bypasses modulation by the auxiliary data signal. This may be advantageous, for example, in providing a reference signal or other information to a decoder.

Moreover, since the PN period is finite and the characteristics of the subband filter bank 410 are known, the subband filtered PN sequences $SP_0$, $SP_1$, $SP_2$, ..., $SP_{N-1}$ can be pre-computed and stored in a lookup table. And, when the PC-HDT encoder adds known data repeatedly, the auxiliary data subband samples $SPD_0$, $SPD_1$, $SPD_2$, ..., $SPD_{N-1}$ can also be precomputed and stored. In this manner, implementation of the PC-HDT encoder of the present invention can be simplified and computational requirements reduced.

Figure 5:
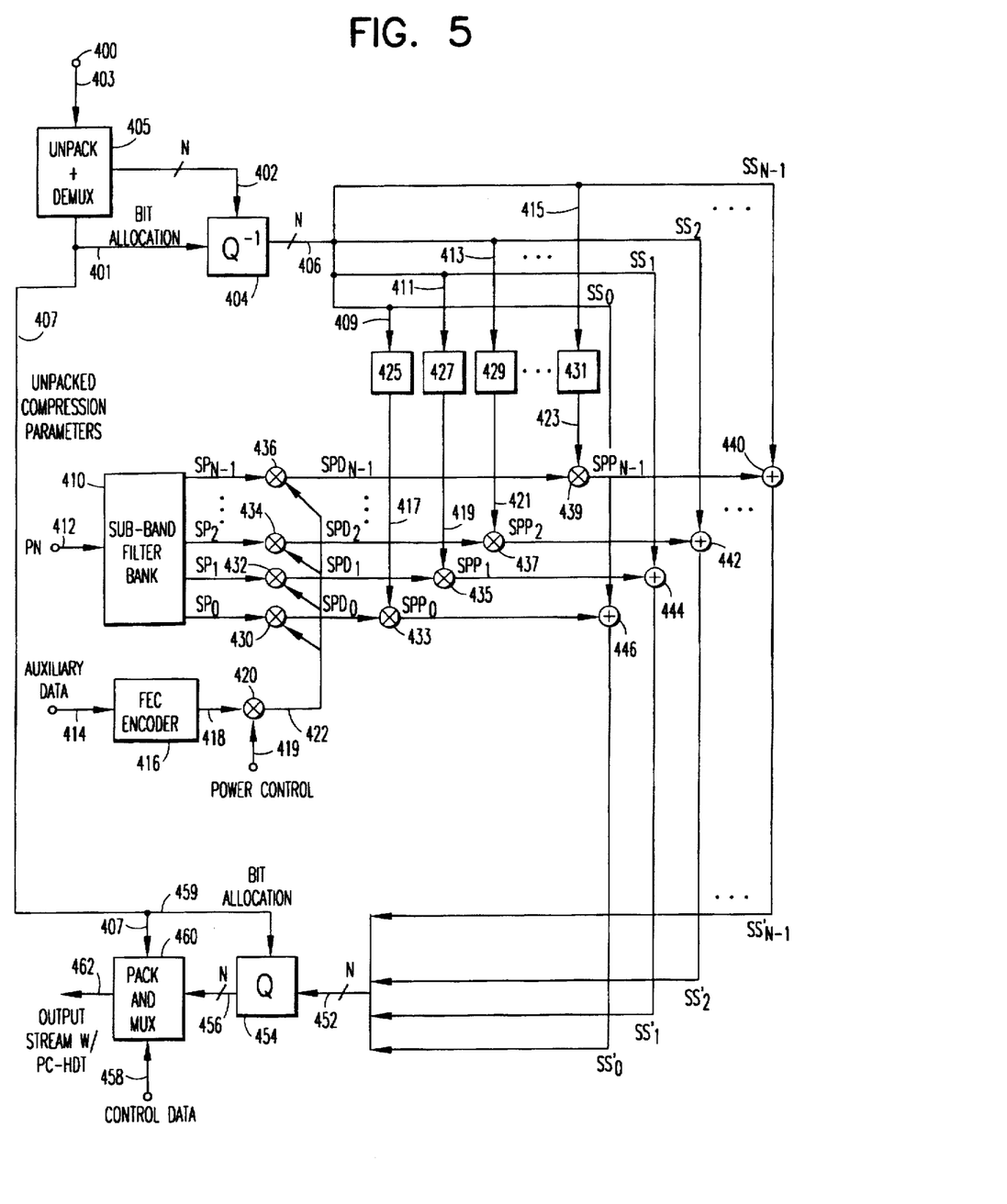
FIG. 5 is a block diagram of an alternate embodiment of a post-compression hidden data transport system encoder in accordance with the present invention.

FIG. 5 is a block diagram of an alternate embodiment of the post-compression hidden data transport system encoder in accordance with the present invention. Elements of FIG. 5 correspond to like-numbered elements of FIG. 4, unless stated otherwise. In this embodiment, the audio subband samples $SS_0, SS_1, SS_2, \ldots, SS_{N-1}$ provided via lines 406 have nonuniform power spectrums. Accordingly, in order to shape the auxiliary data subband samples $SPD_0, SPD_1, SPD_2, \ldots, SPD_{N-1}$ to the spectrum of the audio subband samples, the audio subband samples are provided to subband power controllers (SPCs) 425, 427, 429 and 431 via lines 409, 411, 413 and 415, respectively.

The SPCs determine power modulation signals (P) based on the desired signal-to-noise ratio (SNR) of the auxiliary data subband samples to the audio data subband samples in each subband, and the square root of the average of the square of the energy ($E_i$) of each of the M audio subband samples. That is, for each subband, $$P = SNR \cdot \sqrt{\frac{1}{M} \sum_{i=1}^{N} E_i^2}$$

The power modulation signals are provided to modulators 433, 435, 437 and 439 via lines 417, 419, 421 and 423, respectively. At the modulators 433, 435, 437 and 439, the power of the auxiliary data subband samples $SPD_0, SPD_1, SPD_2, \ldots, SPD_{N-1}$ is adjusted, thereby resulting in power-adjusted auxiliary data subband samples $SPP_0, SPP_1, SPP_2, \ldots, SPP_{N-1}$. The power-adjusted auxiliary data subband samples, which are spectrally shaped according to the audio subband samples, are then combined with the audio subband samples $SS_0, SS_1, SS_2, \ldots, SS_{N-1}$ at combiners (e.g., XOR gates) 446, 444, 442 and 440, respectively, to provide the combined samples $SS'_0, SS'_1, SS'_2, SS'_{N-1}$. The quantized data, the unpacked compression parameters provided on line 407, and the control data on line 458 are packed into a new frame, and provided via line 462 for transmission to a decoder.

In fact, the embodiment of FIG. 5 can result in significant computational savings when the audio subband samples are not normalized. This can be seen by noting that normalization and de-normalization of the audio subband samples requires a total of 2N operations, while power-adjustment via the subband power control requires only N operations (where N=number of subbands). Computations are thus reduced by 50% when the SPCs of FIG. 5 are employed.

Figure 6:
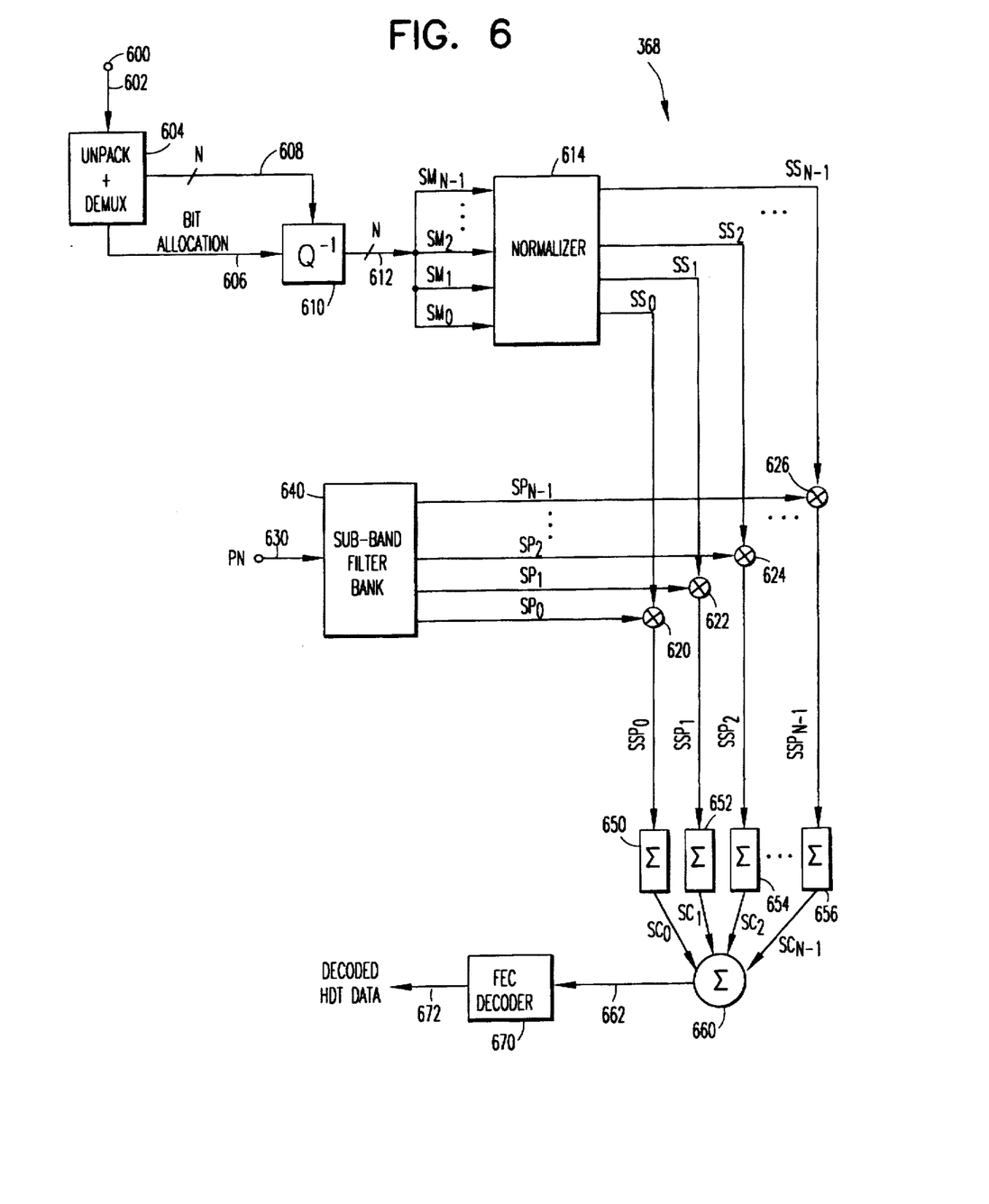
FIG. 6 is a block diagram of a post-compression hidden data transport system decoder in accordance with the present invention.

FIG. 6 is a block diagram of the post-compression hidden data transport system decoder in accordance with the present invention. The compressed digital packetized stream is received at input terminal 600 of the decoder 368 and provided to an unpack and demultiplex function 604 via line 602. An inverse quantizer 610 receives the subband samples via lines 608 and the bit allocation data via line 606. Inverse quantized audio subband samples $SM_0, SM_1, SM_2, \ldots, SM_{N-1}$ are provided via lines 612. If the audio subband samples $SM_0, SM_1, SM_2, \ldots, SM_{N-1}$ are not already normalized, a normalizer 614 is provided to normalize the audio subband samples to provide an approximately uniform power spectrum across all subbands.

If the audio subband samples in the combined subband samples $SM_0, SM_1, SM_2, \ldots, SM_{N-1}$ are already normalized, the normalizer 614 is not required. Combined subband samples including the normalized audio subband samples $SS_0, SS_1, SS_2, \ldots, SS_{N-1}$ are combined with sequences $SP_0, SP_1, SP_2, \ldots, SP_{N-1}$ at demodulators 620, 622, 624 and 626, respectively.

The sequences $SP_0, SP_1, SP_2, \ldots, SP_{N-1}$ in this embodiment are spread spectrum carrier signals generated from a subband filtered pseudo-noise (PN) sequence corresponding to the PN sequence used at the PC-HDT encoder. The PN sequence is provided via line 630 to a subband filter bank 640, which corresponds to the subband filter bank of the encoder. The filtered PN sequences are provided on each of the lines $SP_0, SP_1, SP_2, \ldots, SP_{N-1}$ to the demodulators 620, 622, 624 and 626, respectively. As with the PC-HDT encoder, the sequences $SP_0, SP_1, SP_2, \ldots, SP_{N-1}$ of the PC-HDT decoder can be pre-computed and stored in a lookup table to reduce computational requirements.

The product of the filtered PN sequences and the combined subband samples is provided via lines $SSP_0, SSP_1, SSP_2, \ldots, SSP_{N-1}$ to integrators 650, 652, 654 and 656, respectively. By integrating the data in each of the subbands over L consecutive samples, the auxiliary signal in each subband is despread. The number of samples L for the integration should be selected such that L×N (i.e., processing gain) is greater than the SNR of the PN sequence to the audio subband samples before despreading of the signals $SS_0, SSP_1, SSP_2, \ldots, SSP_{N-1}$.

The despread auxiliary data samples are provided to a summer 660 via lines $SC_0, SC_1, SC_2, \ldots, SC_{N-1}$ and summed across the N subbands to recover the encoded auxiliary data samples at line 662. Moreover, the SNR of the PN sequence to the audio subband samples after despreading can be increased by increasing the number of subbands N, since the SNR is proportional to the square root of N. An FEC decoder 670 decodes the auxiliary data samples of line 662 and corrects channel errors, thereby providing decoded auxiliary data at line 672.

The decoded auxiliary data can then be used in a variety of applications. For example, the auxiliary data can be provided to a copy management device to control the reproduction of the audio and associated data signals.

The aforementioned recovery and despread process is modified slightly when auxiliary data subband samples from different auxiliary signals are carried in the different subbands, or when auxiliary data subband samples from more than one auxiliary signal is carried in one subband. Both partial and fully overlapping situations are also possible, along with various combinations of the above cases. Generally, however, the PC-HDT decoder provides operations which are inverse to those of the PC-HDT encoder. For instance, if auxiliary data subband samples corresponding to different auxiliary signals are carried in the combined subbands samples, then the integration must be modified from the embodiment of FIG. 6 such that only common auxiliary data samples are summed together. Similarly, if auxiliary data subband samples are encoded using different PN sequences, time-shifted versions of the same PN sequence, or any combination thereof, the subband filtered PN sequences $SP_0, SP_1, SP_2, \ldots, SP_{n-1}$ must be generated using a corresponding PN sequence.

Alternatively, the FEC decoder 670 may be replaced by a threshold device that detects the energy in the auxiliary signal of line 662, and compares that energy to a suitable threshold. Thus, the decoder can determine whether an auxiliary signal is present without having to perform FEC decoding. Moreover, to increase detection accuracy, the decoder can examine a sequence of auxiliary data values before declaring a detection. Detection can be further facilitated if the encoder uses a unique pattern for the auxiliary data.

Additionally, acquisition of the compressed digital audio bitstream and synchronization with the subband filtered PN sequences $SP_0, SP_1, SP_2, \ldots, SP_{N-1}$ can be enhanced and simplified if the PN generator used to generate the PN sequence is locked in a predetermined pattern to the audio bitstream. That is, since all modern audio compressors utilize a frame structure wherein each frame of bits represents a fixed number of audio samples, there are a fixed number of frames in a given time period. Thus, by choosing a repetition period for the filtered PN sequences that is an integer multiple of the audio data frame period, the number of PN sequence hypotheses required to demodulate the auxiliary signal is reduced. For example, if the PN sequence period has a duration of 4096 samples and the frame period has a duration of 256 samples, then only 4096/256=16 hypotheses have to be tested for each subband.

In yet another alternate embodiment of the PC-HDT decoder of FIG. 6, which may be used in conjunction with the PC-HDT encoder of FIG. 5, where the recovered auxiliary data subband samples have a nonuniform power spectrum, it may be desirable to normalize the power spectrum across all the subbands in which the auxiliary data subband samples are carried prior to integration. This can be accomplished by adjusting the power of the subband filtered PN sequences $SP_0, SP_1, SP_2, \ldots, SP_{N-1}$ using controllers similar to the SPCs 425, 427, 429 and 431 of FIG. 5.

Figure 7:
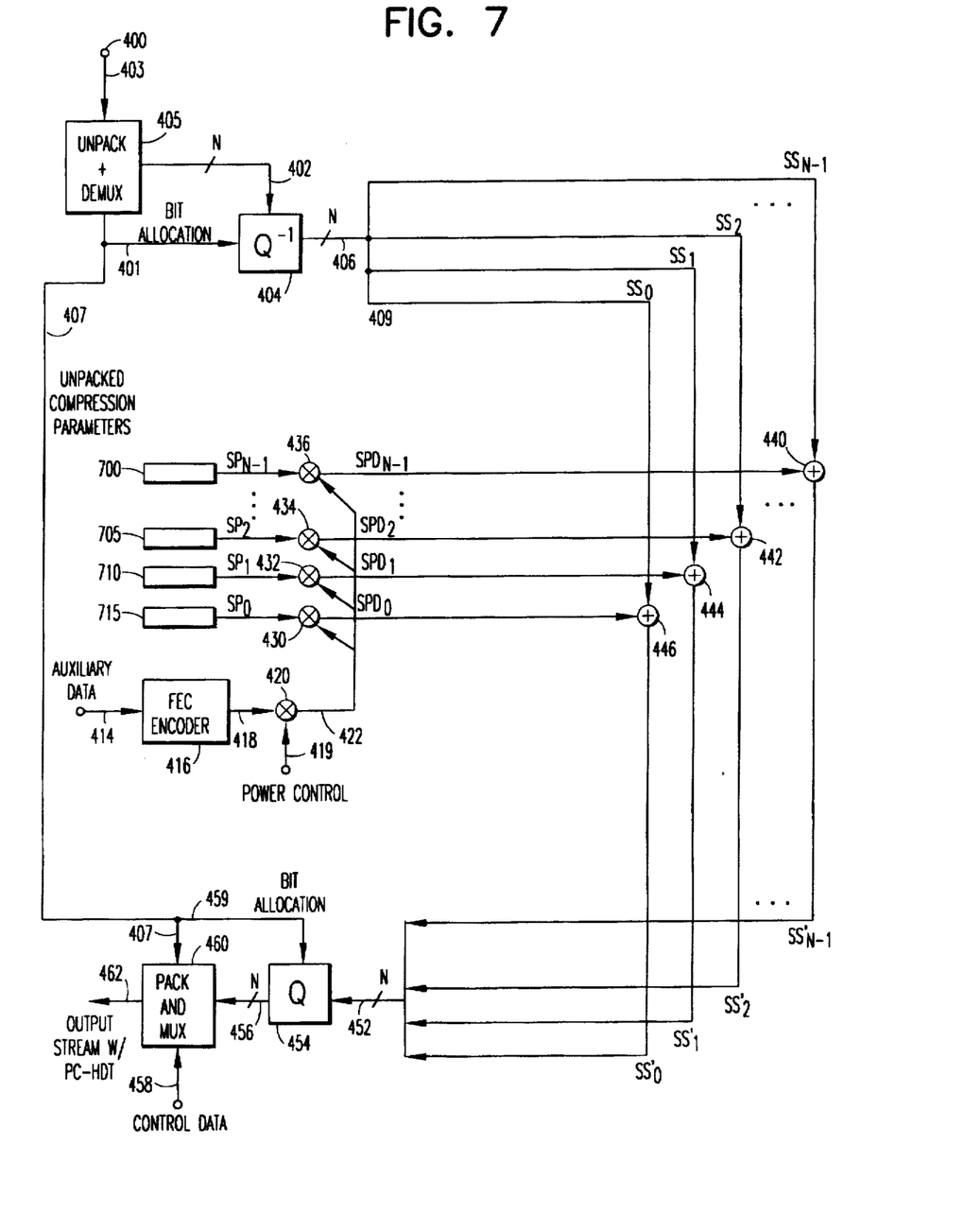
FIG. 7 is a block diagram of another alternate embodiment of a post-compression hidden data transport system encoder in accordance with the present invention.

FIG. 7 is a block diagram of another alternate embodiment of a post-compression hidden data transport system encoder in accordance with the present invention. Elements of FIG. 7 correspond to like-numbered elements of FIG. 4, unless stated otherwise. In this embodiment, the audio subband samples $SS_0, SS_1, SS_2, \ldots, SS_{N-1}$ provided via lines 406 have uniform power spectrums. However, instead of providing subband filtered spread spectrum PN sequences, which are generated from a pseudo-randomly varying sequence of values with magnitude +1 or −1, the sequences $SP_0, SP_1, SP_2, \ldots, SP_{N-1}$ are provided as "sparse" PN sequences.

With a sparse PN sequence, a pseudo-random sequence is generated which comprises mostly zeros, but with values of +1 and −1, for example, randomly interspersed. The sparse PN sequence is added at specific locations known to the PC-HDT encoder and decoder. A sparse PN sequence results in a lower data rate since the processing gain $G_p$ is reduced in proportion to the average occurrence of non-zero samples. For example, if the sparse PN sequence has one value in ten which is non-zero, the processing gain $G_p$ is reduced by a factor of ten relative to a regular PN sequence. However, advantageously, degradation of the audio subband samples and implementation complexity are also reduced. Moreover, though a lower data rate results, this may be acceptable in certain situations, such as when the presence or absence of the auxiliary data itself is the only concern.

In accordance with this embodiment of the present invention, sparse PN sequence generators 715, 710, 705 and 700 are provided. Corresponding sparse PN sequences $SP_0, SP_1, SP_1, \ldots, SP_{N-1}$ are coupled to a plurality of modulators 430, 432, 434 and 436, respectively. The modulators modulate the sparse PN sequences $SP_0, SP_1, SP_1, \ldots, SP_{N-1}$ to provide the auxiliary data subband samples $SPD_0, SPD_1, SPD_2, \ldots, SPD_{N-1}$, respectively. The auxiliary data subband samples are then combined with the audio subband samples $SS_0, SS_1, SS_2, \ldots, SS_{N-1}$ at combiners 446, 444, 442 and 440, respectively, to provide the combined samples $SS'_0, SS'_1, SS'_2, \ldots, SS'_{N-1}$. The combined samples are then quantized, packed, and multiplexed into the new frame.

In alternative embodiments, sparse PN generators 700, 705, 710 and 715 may provide different sparse PN sequences, the same sparse PN sequence, time-shifted versions of the same sparse PN sequence, or any combination thereof. Similarly, selected ones of the modulators 430, 432, 434 and 436 may be bypassed such that some of the signals $SPD_0, SPD_1, SPD_2, \ldots, SPD_{N-1}$ do not carry auxiliary data.

In yet another embodiment of the present invention, both spread spectrum PN sequences and sparse PN sequences may be employed for carrying the auxiliary data subband samples. Spread spectrum PN sequences and sparse PN sequences may be employed concurrently or in a time-alternating manner in the same or different subbands. As an example, a first sequence of auxiliary data subband samples may be carried in a first subband by a spread spectrum PN sequence, while a second sequence of auxiliary data subband samples may be carried in a second subband by a sparse PN sequence.

Or, analogous to the layering scheme discussed previously, first and second auxiliary data subband sample sequences may be carried in the same subband by a spread spectrum PN sequence and a sparse PN sequence, respectively. Furthermore, in a time-division scheme, a given sequence of auxiliary data subband samples are first carried in a given subband by a spread spectrum PN sequence, and then (in the same subband) by a sparse PN sequence, and so forth. Alternately, a first sequence of auxiliary data subband samples can be carried by a spread spectrum PN sequence in a first subband, then in a second subband (by the same spread spectrum PN sequence), and so forth. Moreover, the same sequence, time-shifted versions of the same sequence, different sequences, or any combination thereof may be used in the various time segments.

Further still, the PC-HDT encoder may include decision means for switching between spread spectrum and sparse PN sequences. For example, it may be desirable to use sparse PN sequences when embedding auxiliary data in a quiet high-fidelity musical passage where distortion should be minimized, while spread spectrum PN sequences can be used for voice-only programs such as news reports where absolute fidelity is less important.

In yet another embodiment of the present invention, a "sample twiddling" sequence is generated in cooperation with the sparse PN sequence discussed above. Specifically, audio subband samples from the transport data stream are pseudo-randomly selected. For example, assume four bits in two's complement notation are used to represent a subband sample with value "+5" (e.g., 0101 in binary). Then, the current sparse PN sequence value, which is independently generated, is added to the subband sample to create a new data carrier sequence.

For example, if the current sparse PN sequence value is "−1", the modified subband sample will be 5−1=4 (0100 in binary). If the current sparse PN sequence value is "+1", the modified subband sample will be 5+1=6 (0110 in binary). Furthermore, if the current sparse PN sequence value is "0", the modified subband sample will be unchanged. Moreover, when four bits are allocated, the subband sample is constrained to take on values between "+7" and "−8" (e.g., between 0111 and 1000 in binary). Thus, if the current subband sample has a value "+7" and the current sparse PN sequence has a value "+1", the subband sample will not change. In the manner discussed previously, a sample twiddle sequence is generated and used to carry the auxiliary data subband samples. Moreover, with sample twiddling, the required inverse quantization steps are significantly reduced since there is no need to apply scale factors or an inverse quantization equation to the subband samples. The only requirement is that the subband samples be in a two's complement representation.

In still another embodiment of the present invention, a "bit twiddling" sequence is generated in cooperation with the sparse PN sequence discussed above. An audio subband sample from the transport data stream is pseudo-randomly selected. For example, assume again that four bits (in two's complement notation) are used to represent a subband sample with value "+5" (e.g., 0101 in binary). Then, the current status of the sparse PN sequence is added to the least significant bit (LSB) of the binary representation of the subband sample.

For instance, the least significant bit of the subband sample "0101" is "1". If the current sparse PN sequence value is "−1", the LSB of the modified subband sample is flipped to 1−1=0. If the current sparse PN sequence value is "+1", the modified subband sample will be unchanged since the LSB can only take on values of zero or one. Furthermore, if the LSB of the selected audio subband sample is "0", and the corresponding sparse PN sequence value has value "1", then the LSB of the sample is flipped to "1". If LSB=1 and the corresponding sparse PN sequence value has value "−1", then the LSB is flipped to "0". In other cases, including when the sparse PN sequence has value "0", the LSB of the subband sample is unchanged. The resulting bit twiddling sequence is modulated by the auxiliary data subband samples in the manner discussed previously. Moreover, with bit twiddling, the required inverse quantization steps can be eliminated since there is no need to provide the subband sample in a two's complement format, or to apply scale factors or an inverse quantization equation to the subband samples. This advantageously reduces implementation complexity.

Furthermore, sample twiddling and bit twiddling may be used in conjunction with the spread spectrum PN sequence and sparse PN sequence in the variations and combinations discussed herein.

Figure 8:
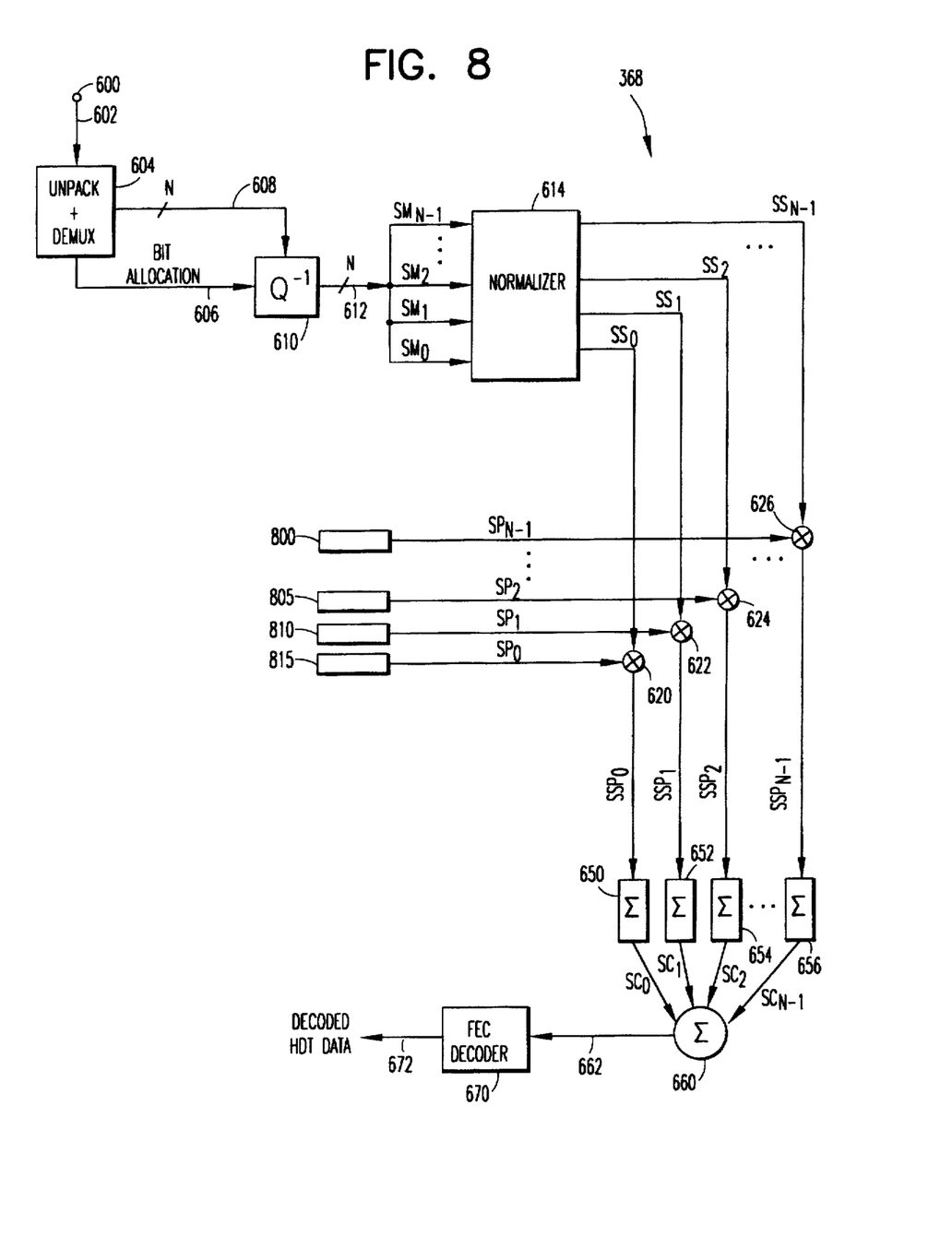
FIG. 8 is a block diagram of an alternate embodiment of a post-compression hidden data transport system decoder in accordance with the present invention.

FIG. 8 is a block diagram of an alternate embodiment of a post-compression hidden data transport system decoder in accordance with the present invention. This decoder can be used in conjunction with the encoder of FIG. 7. Elements of FIG. 8 correspond to like-numbered elements of FIG. 6, unless stated otherwise. In this embodiment, the combined samples $SS_0$, $SS_1$, $SS_2$, ..., $SS_{N-1}$ on lines 612 include auxiliary data subband samples which were carried using sparse PN sequences. Accordingly, the same sparse PN sequences which were used by the encoder must be used by the decoder. Of course, if sample twiddling or bit twiddling sequences were used to carry the auxiliary data subband samples, corresponding demodulation sequences are required in the decoder.

Sparse PN sequence generators 815, 810, 805 and 800 provide sparse PN sequences $SP_0$, $SP_1$, $SP_2$, ..., $SP_{N-1}$ respectively. The sparse PN sequences $SP_0$, $SP_1$, $SP_1$, ..., $SP_{N-1}$ are used to demodulate the combined subband samples $SS_0$, $SS_1$, $SS_2$, ..., $SS_{N-1}$ at demodulators 620, 622, 624 and 626, respectively, to provide the auxiliary data subband samples $SSP_0$, $SSP_1$, $SSP_2$, ..., $SSP_{N-1}$. The auxiliary data samples are then despread by integrators 650, 652, 654 and 656, summed at summer 660, and provided to an FEC decoder 670 as discussed previously.

It should now be appreciated that the invention provides substantially inaudible auxiliary data subband samples in a pre-existing subband coded digital audio data stream. Audio subband samples are retrieved from compressed, digitized audio data in a packetized stream and normalized, if necessary, prior to combination with auxiliary data subband samples. The auxiliary data subband samples are provided via subband filtered PN sequences, sparse PN sequences, sample twiddle sequences, or bit twiddle sequences, or combinations thereof. Moreover, not all of the audio subbands must carry the auxiliary data.

Combined subband samples which include the auxiliary data subband samples are de-normalized, if necessary, prior to recombination with the packetized stream as a new frame or as part of a pre-existing frame. The auxiliary data subband samples are spectrally shaped to the audio either during de-normalization, or during recovery to baseband of the digital audio data.

Although the invention has been described in connection with various specific embodiments, it will be appreciated by those skilled in the art that numerous adaptations and modifications may be made thereto without departing from the spirit and scope of the invention as set forth in the claims.

We claim:

1. A method for providing auxiliary data subband samples in a compressed subband coded digital audio data stream, comprising the steps of:

providing a plurality of audio subband samples from said data stream;

providing a data carrier sequence;

modulating said data carrier sequence by an auxiliary data signal to provide said auxiliary data subband samples;

combining said auxiliary data subband samples with corresponding audio subband samples to produce combined subband samples in which said auxiliary data subband samples are carried substantially inaudibly; and providing said combined subband samples for transport in said digital audio data stream.

2. The method of claim 1, wherein said audio subband samples have a nonuniform power spectrum, comprising the further steps of:

normalizing said audio subband samples to provide an approximately uniform power spectrum thereof; and de-normalizing said combined subband samples subsequent to said normalizing step to restore said nonuniform power spectrum of said audio subband samples, and to spectrally shape said auxiliary data subband samples in said combined subband samples according to said nonuniform power spectrum.

3. The method of claim 1, wherein said audio subband samples have a nonuniform power spectrum, comprising the further step of:

shaping said auxiliary data subband samples according to said nonuniform power spectrum.

4. The method of claim 1, wherein said data carrier sequence is modulated by different auxiliary data signals, thereby allowing combined subband samples in which auxiliary data subband samples corresponding to said different auxiliary data signals are carried.

5. The method of claim 1, wherein auxiliary data subband samples from a plurality of auxiliary signals are carried in one of said audio subbands.

6. The method of claim 1, comprising the further step of:

inverse quantizing said audio subband samples;

quantizing said combined subband samples subsequent to said inverse quantizing step; and allocating bits for said inverse quantizing and quantizing steps.

7. The method of claim 1, wherein said data carrier sequence comprises at least one of:

(a) a pseudo-noise (PN) subband sequence provided over at least one subband;

(b) different PN subband sequences provided over one subband;

(c) time-shifted versions of the same PN subband sequence provided over one subband;

(d) a sparse PN sequence provided over at least one subband;

(e) different sparse PN sequences provided over one subband;

(f) time-shifted versions of the same sparse PN sequence provided over one subband;

(g) a sample twiddling sequence provided over at least one subband;

(h) different sample twiddling sequences provided over one subband;

(i) time-shifted versions of the same sample twiddling sequence provided over one subband;

(j) a bit twiddling sequence provided over at least one subband;

(k) different bit twiddling sequences provided over one subband; and (l) time-shifted versions of the same bit twiddling sequence provided over one subband.

8. The method of claim 1, comprising the further step of:

combining said data carrier sequence with said audio subband samples to produce combined subband samples in which said data carrier sequence is carried substantially inaudibly.

9. The method of claim 1, wherein said data carrier sequence is subband filtered over a plurality of subbands corresponding to said plurality of audio subband samples.

10. The method of claim 9 wherein said auxiliary data subband samples are carried in a plurality of subbands of said combined subband samples.

11. A method for recovering auxiliary data subband samples representative of an auxiliary data signal from a compressed digital data stream, said auxiliary data subband samples being provided by modulating a first data carrier sequence by said auxiliary data signal, said auxiliary data subband samples being carried with audio subband samples in combined subband samples in said compressed digital data stream, comprising the steps of:

recovering said combined subband samples from said data stream;

providing a recovery data carrier sequence corresponding to said first data carrier sequence; and demodulating said combined subband samples using said recovery data carrier sequence to recover said auxiliary data subband samples from said recovered combined subband samples.

12. The method of claim 11, wherein said recovery data carrier sequence comprises at least one of:

(a) a pseudo-noise (PN) subband sequence provided over at least one subband;

(b) different PN subband sequences provided over one subband;

(c) time-shifted versions of the same PN subband sequence provided over one subband;

(d) a sparse PN sequence provided over at least one subband;

(e) different sparse PN sequences provided over one subband;

(f) time-shifted versions of the same sparse PN sequence provided over one subband;

(g) a sample twiddling sequence provided over at least one subband;

(h) different sample twiddling sequences provided over one subband;

(i) time-shifted versions of the same sample twiddling sequence provided over one subband;

(j) a bit twiddling sequence provided over at least one subband;

(k) different bit twiddling sequences provided over one subband; and (l) time-shifted versions of the same bit twiddling sequence provided over one subband;

said method comprising the further steps of:

despreading said recovered auxiliary data subband samples using said recovery data carrier sequence; and summing said despread auxiliary data subband samples across selected subband channels to recover said auxiliary data signal.

13. The method of claim 12, wherein said despreading step integrates said recovered auxiliary data subband samples to provide said despread auxiliary data subband samples.

14. The method of claim 11, wherein said audio subband samples have a nonuniform power spectrum, comprising the further step of:

normalizing said combined subband samples to provide an approximately uniform power spectrum for said audio subband samples in said combined subband samples.

15. The method of claim 11, comprising the further step of:

inverse quantizing said combined subband samples; and allocating bits for said inverse quantizing step.

16. The method of claim 11, wherein said recovery data carrier sequence is subband filtered over a plurality of subbands corresponding to said plurality of audio subband samples.

17. The method of claim 16 wherein said auxiliary data subband samples are carried in a plurality of subbands of said combined subband samples.

18. An encoder for providing auxiliary data subband samples, which are representative of an auxiliary data signal, in a compressed subband coded digital audio data stream, comprising:

an input terminal for receiving said digital audio data stream and providing a plurality of audio subband samples;

a data carrier generator for providing a data carrier sequence;

a modulator for modulating said data carrier sequence by said auxiliary data signal to provide said auxiliary data subband samples;

a combiner coupled to said modulator for combining said auxiliary data subband samples with corresponding audio subband samples to produce combined subband samples in which said auxiliary data subband samples are carried substantially inaudibly; and an output terminal coupled to said combiner for providing said combined subband samples for transport in said digital audio data stream.

19. The encoder of claim 18, wherein said audio subband samples have a nonuniform power spectrum, further comprising:

a normalizer for normalizing said audio subband samples to provide an approximately uniform power spectrum thereof; and a de-normalizer for de-normalizing said combined subband samples subsequent to said normalizing step to restore said nonuniform power spectrum and to spectrally shape said auxiliary data subband samples in said combined subband samples according to said nonuniform power spectrum.

20. The encoder of claim 18, wherein said audio subband samples have a nonuniform power spectrum, further comprising:

a normalizer for normalizing said auxiliary data subband samples to spectrally shape said auxiliary data subband samples according to said nonuniform power spectrum.

21. The encoder of claim 18, further comprising:

a packetizer for packetizing said combined subband samples; and a multiplexer for multiplexing the packetized combined subband samples into a packetized transport stream.

22. The encoder of claim 18, wherein said data carrier sequence is modulated by different auxiliary data signals to provide auxiliary data subband samples, thereby allowing combined subband samples in which said auxiliary data subband samples corresponding to said different auxiliary data signals are carried.

23. The encoder of claim 18, further comprising:

an inverse quantizer for inverse quantizing said combined subband samples;

a quantizer for quantizing said combined subband samples; and bit allocation means coupled to said inverse quantizer and said quantizer for allocating bits for said inverse quantizing and said quantizing.

24. The encoder of claim 18, wherein said data carrier sequence comprises at least one of:

(a) a pseudo-noise (PN) subband sequence provided over at least one subband;

(b) different PN subband sequences provided over one subband;

(c) time-shifted versions of the same PN noise subband sequence provided over one subband;

(d) a sparse PN sequence provided over at least one subband;

(e) different sparse PN sequences provided over one subband;

(f) time-shifted versions of the same sparse PN sequence provided over one subband;

(g) a sample twiddling sequence provided over at least one subband;

(h) different sample twiddling sequences provided over one subband;

(i) time-shifted versions of the same sample twiddling sequence provided over one subband;

(j) a bit twiddling sequence provided over at least one subband;

(k) different bit twiddling sequences provided over one subband; and (l) time-shifted versions of the same bit twiddling sequence provided over one subband.

25. The encoder of claim 18, further comprising:

means for combining said data carrier sequence with said audio subband samples to produce combined subband samples in which said data carrier sequence is carried substantially inaudibly.

26. The encoder of claim 18, wherein said data carrier sequence is subband filtered over a plurality of subbands corresponding to said plurality of audio subband samples.

27. The encoder of claim 26 wherein said auxiliary data subband samples are carried in a plurality of subbands of said combined subband samples.

28. A decoder for recovering auxiliary data subband samples which are representative of an auxiliary data signal from a compressed digital data stream, said auxiliary data subband samples being provided by modulating a first data carrier sequence by said auxiliary data signal, said auxiliary data subband samples being carried with audio subband samples in combined subband samples in said compressed digital data stream, comprising:

means for recovering said combined subband samples from said compressed digital data stream;

means for providing a recovery data carrier sequence corresponding to said first data carrier sequence; and a demodulator for demodulating said combined subband samples using said recovery data carrier sequence to recover said auxiliary data subband samples from said recovered combined subband samples.

29. The decoder of claim 28 further comprising:

means for despreading said recovered auxiliary data subband samples to provide a corresponding plurality of despread auxiliary data subband samples; and a summer for summing said despread auxiliary data subband samples across said subband channels to recover said auxiliary data signal.

30. The decoder of claim 29, wherein said despreading means comprises integrators for integrating said recovered auxiliary data subband samples to provide said despread auxiliary data subband samples.

31. The decoder of claim 28, further comprising:

a normalizer for normalizing said audio subband samples in said combined subband samples prior to said demodulating to provide an approximately uniform power spectrum for said audio subband samples.

32. The decoder of claim 28, further comprising:

a normalizer for normalizing said combined subband signals prior to said demodulating to provide an approximately uniform power spectrum for said auxiliary data subband samples.

33. The decoder of claim 28, wherein auxiliary data subband samples corresponding to different auxiliary data signals are carried in said combined subbands of said digital audio data stream; and said demodulator recovers said auxiliary data subband samples using different recovery data carrier sequences.

34. The decoder of claim 28, further comprising:

an inverse quantizer for inverse quantizing said combined subband samples; and bit allocation means for allocating bits for said inverse quantizing.

35. The decoder of claim 28, wherein said recovery data carrier sequence comprises at least one of:

(a) a pseudo-noise (PN) subband sequence provided over at least one subband;

(b) different PN subband sequences provided over one subband;

(c) time-shifted versions of the same PN subband sequence provided over one subband;

(d) a sparse PN sequence provided over at least one subband;

(e) different sparse PN sequences provided over one subband;

(f) time-shifted versions of the same sparse PN sequence provided over one subband;

(g) a sample twiddling sequence provided over at least one subband;

(h) different sample twiddling sequences provided over one subband;

(i) time-shifted versions of the same sample twiddling sequence provided over one subband;

(j) a bit twiddling sequence provided over at least one subband;

(k) different bit twiddling sequences provided over one subband; and (l) time-shifted versions of the same bit twiddling sequence provided over one subband.

36. The decoder of claim 28, wherein said recovery data carrier sequence is subband filtered over a plurality of subbands corresponding to said plurality of audio subband samples.

37. The decoder of claim 36, wherein said auxiliary data subband samples are carried in a plurality of subbands of said combined subband samples.

38. A compressed digital data storage media, comprising:

(i) storage means for storing combined subband samples including audio subband samples which represent an audio signal, and auxiliary data subband samples which represent an auxiliary data signal;

said auxiliary data subband samples being provided by modulating a data carrier sequence by said auxiliary data signal over at least one subband corresponding to said audio subband samples;

said auxiliary data signal being carried substantially inaudibly in said audio signal;

said auxiliary data signal being spectrally shaped according to said audio signal; and (ii) means for allowing the recovery of said auxiliary data signal from said auxiliary data subband samples.

39. The storage media of claim 38, wherein auxiliary data subband samples corresponding to different auxiliary data signals are carried in said combined subband samples.

40. The storage media of claim 38, wherein auxiliary data subband samples corresponding to different auxiliary data signals are carried in one of said audio subbands.

41. The storage media of claim 38, wherein said data carrier sequence comprises at least one of:

(a) a pseudo-noise (PN) subband sequence provided over at least one subband;

(b) different PN subband sequences provided over one subband;

(c) time-shifted versions of the same PN subband sequence provided over one subband;

(d) a sparse PN sequence provided over at least one subband;

(e) different sparse PN sequences provided over one subband;

(f) time-shifted versions of the same sparse PN sequence provided over one subband;

(g) a sample twiddling sequence provided over at least one subband;

(h) different sample twiddling sequences provided over one subband;

(i) time-shifted versions of the same sample twiddling sequence provided over one subband;

(j) a bit twiddling sequence provided over at least one subband;

(k) different bit twiddling sequences provided over one subband; and (l) time-shifted versions of the same bit twiddling sequence provided over one subband.

42. The storage media of claim 38, wherein said data carrier sequence is subband filtered over a plurality of subbands corresponding to said audio subband samples.

43. The storage media of claim 42, wherein said auxiliary data subband samples are carried in a plurality of subbands of said combined subband samples.

* * * * *